United States Patent
Chen et al.

(10) Patent No.: US 11,979,661 B1
(45) Date of Patent: *May 7, 2024

(54) METHOD FOR PERFORMING LIGHT SHAPING WITH AID OF ADAPTIVE PROJECTOR, AND ASSOCIATED APPARATUS

(71) Applicant: HIMAX TECHNOLOGIES LIMITED, Tainan (TW)

(72) Inventors: Wu-Feng Chen, Tainan (TW); Ching-Wen Wang, Tainan (TW); Cheng-Che Tsai, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 65 days.

This patent is subject to a terminal disclaimer.

(21) Appl. No.: 17/982,494

(22) Filed: Nov. 7, 2022

(51) Int. Cl.
*G06T 7/521* (2017.01)
*H04N 23/611* (2023.01)
*H04N 23/67* (2023.01)
*G06T 7/50* (2017.01)

(52) U.S. Cl.
CPC ........... *H04N 23/671* (2023.01); *G06T 7/521* (2017.01); *G06T 7/50* (2017.01); *H04N 23/611* (2023.01)

(58) Field of Classification Search
CPC ...... H04N 5/2226; H04N 23/611; G06T 7/50; G06T 7/521
USPC ..................................................... 348/207.99
See application file for complete search history.

(56) References Cited

U.S. PATENT DOCUMENTS

| | | | |
|---|---|---|---|
| 2018/0196998 A1* | 7/2018 | Price | G01S 17/86 |
| 2019/0018137 A1* | 1/2019 | Akkaya | G01S 7/4915 |
| 2019/0149796 A1* | 5/2019 | Tsai | G06T 7/55 |
| | | | 348/46 |
| 2019/0174118 A1* | 6/2019 | Wei | H04N 13/239 |
| 2019/0295279 A1* | 9/2019 | Wang | H04N 23/74 |
| 2021/0150744 A1* | 5/2021 | Sambongi | G06T 7/593 |
| 2021/0209778 A1* | 7/2021 | Chan | G01S 17/894 |
| 2022/0292703 A1* | 9/2022 | Matsumoto | H04N 13/128 |

* cited by examiner

*Primary Examiner* — Anthony J Daniels
(74) *Attorney, Agent, or Firm* — Winston Hsu

(57) ABSTRACT

A method for performing light shaping with aid of an adaptive projector and associated apparatus are provided. The method includes: utilizing an image processing circuit to obtain distance information; utilizing the image processing circuit to determine a distance range according to the distance information; utilizing the image processing circuit to perform projection light-shaping type selection to determine at least one selected projection light-shaping type corresponding to the distance range among multiple predetermined projection light-shaping types; utilizing the adaptive projector to perform projection of the at least one selected projection light-shaping type to perform spatial exposure bracketing, for capturing at least one corresponding image with a camera, to allow the image processing circuit to perform at least one detection operation according to the at least one corresponding image to generate at least one detection result, for performing subsequent processing of the hybrid depth detection device.

11 Claims, 11 Drawing Sheets

(a)

(b)

(c)

(d)

METHOD FOR PERFORMING LIGHT SHAPING WITH AID OF ADAPTIVE PROJECTOR, AND ASSOCIATED APPARATUS

BACKGROUND OF THE INVENTION

1. Field of the Invention

The present invention relates to detection mechanism for electronic devices such as mobile devices, and more particularly, to a method for performing light shaping with aid of an adaptive projector, and associated apparatus such as a hybrid depth detection device, an image processing circuit within the hybrid depth detection device, the adaptive projector within the hybrid depth detection device, etc.

2. Description of the Prior Art

According to the related art, face recognition technologies have been applied to mobile devices, and some face recognition methods for use of the mobile devices have been proposed. However, some problems may occur. For example, when one or more of the mobile devices cannot perform face recognition correctly, a security issue is introduced. There may be a bottleneck of further improvement of the face recognition algorithms. Hence, there is a need for a novel method and associated architecture to enhance the overall performance of an electronic device without introducing a side effect or in a way that is less likely to introduce a side effect.

SUMMARY OF THE INVENTION

It is therefore an objective of the present invention to provide a method for performing light shaping with aid of an adaptive projector, and to provide associated apparatus such as a hybrid depth detection device, an image processing circuit within the hybrid depth detection device, the adaptive projector within the hybrid depth detection device, etc., in order to solve the above-mentioned problems.

At least one embodiment of the present invention provides a method for performing light shaping with aid of an adaptive projector, where the method may comprise: utilizing an image processing circuit within a hybrid depth detection device to obtain distance information, wherein the distance information indicates a distance between the hybrid depth detection device and one or more target objects; utilizing the image processing circuit to determine a distance range according to the distance information, wherein the distance range is selected from multiple predetermined distance ranges regarding the distance; utilizing the image processing circuit to perform projection light-shaping type selection to determine at least one selected projection light-shaping type corresponding to the distance range among multiple predetermined projection light-shaping types, wherein the at least one selected projection light-shaping type is selected from the multiple predetermined projection light-shaping types; and utilizing the adaptive projector within the hybrid depth detection device to perform projection of the at least one selected projection light-shaping type to perform spatial exposure bracketing, for capturing at least one corresponding image with a camera, to allow the image processing circuit to perform at least one detection operation according to the at least one corresponding image to generate at least one detection result, for performing subsequent processing of the hybrid depth detection device.

At least one embodiment of the present invention provides associated apparatus operating according to the method mentioned above. Examples of the apparatus may include, but are not limited to: a hybrid depth detection device, an electronic product (e.g. an electronic device such as a mobile device) equipped with the hybrid depth detection device, the image processing circuit within the hybrid depth detection device, a depth processor within the image processing circuit, the adaptive projector within the hybrid depth detection device, etc.

At least one embodiment of the present invention provides an apparatus for performing light shaping, where the apparatus may comprise an image processing circuit, and further comprise a camera and an adaptive projector that are coupled to the image processing circuit. For example, the image processing circuit can be arranged to obtain distance information, determines a distance range according to the distance information, and perform projection light-shaping type selection to determine at least one selected projection light-shaping type corresponding to the distance range among multiple predetermined projection light-shaping types, wherein the distance information indicates a distance between the hybrid depth detection device and one or more target objects, the distance range is selected from multiple predetermined distance ranges regarding the distance, and the at least one selected projection light-shaping type is selected from the multiple predetermined projection light-shaping types; the adaptive projector can be arranged to perform projection of the at least one selected projection light-shaping type to perform spatial exposure bracketing, to allow the hybrid depth detection device to capture at least one corresponding image with the camera; and the camera can be arranged to capture the at least one corresponding image. More particularly, the image processing circuit performs at least one detection operation according to the at least one corresponding image to generate at least one detection result, for performing subsequent processing of the hybrid depth detection device, wherein the subsequent processing comprises depth-related detection.

The present invention method and associated apparatus (e.g. the hybrid depth detection device, the image processing circuit within the hybrid depth detection device, the depth processor within the image processing circuit, and the adaptive projector within the hybrid depth detection device) can guarantee that various electronic products equipped with the hybrid depth detection device can operate properly in various situations, respectively. In addition, the present invention method and associated apparatus can utilize the adaptive projector to perform the projection of the at least one selected projection light-shaping type to perform spatial exposure bracketing, to guarantee that the subsequent processing such as hybrid depth detection can be correctly performed. Additionally, the present invention method and associated apparatus can utilize the adaptive projector to perform different types of projection to capture corresponding images with the camera respectively, and can perform different types of depth detection according to the corresponding images to generate different intermediate depth maps respectively, and can further perform depth data combination according to the intermediate depth maps to generate a combined depth map such as a weighted depth map, to perform the hybrid depth detection accurately and efficiently. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method for performing light shaping with aid of an adaptive projector, for example, for spatial exposure bracketing, face recognition, etc., and associated apparatus such as at least one portion (e.g. a portion or all) of a hybrid depth detection device. The hybrid depth detection device can operate according to the method to perform two-dimensional (2D) face detection/recognition, depth detection, etc. accurately and efficiently, to achieve optimal performance of any electronic product equipped with the hybrid depth detection device. More particularly, the hybrid depth detection device can perform hybrid depth detection accurately and efficiently to generate one or more depth maps, such as depth maps of human faces, to make the electronic product perform three-dimensional (3D) face recognition according to the one or more depth maps accurately and efficiently, but the present invention is not limited thereto. Examples of the one or more depth maps may include, but are not limited to: depth maps of human faces, indoor or outdoor places, etc. In addition, the electronic product can utilize the hybrid depth detection device to generate at least one depth map corresponding to at least one user of the electronic product, for establishing a 3D face database of the at least one depth map in advance, and can compare a target depth map of a person's face among the one or more depth maps with any depth map of the at least one depth map to determine whether this person is any user of the at least one user. If the target depth map matches the any depth map (e.g. this person is the any user), the electronic product can provide services to this person; otherwise (e.g. this person is not any of the at least one user), the electronic product can prevent this person from using any of the services. Examples of the electronic product may include, but are not limited to: a mobile device such as a multifunctional mobile phone, a tablet, a wearable device, an all-in-one (AIO) computer, and a laptop computer.

Figure 1:
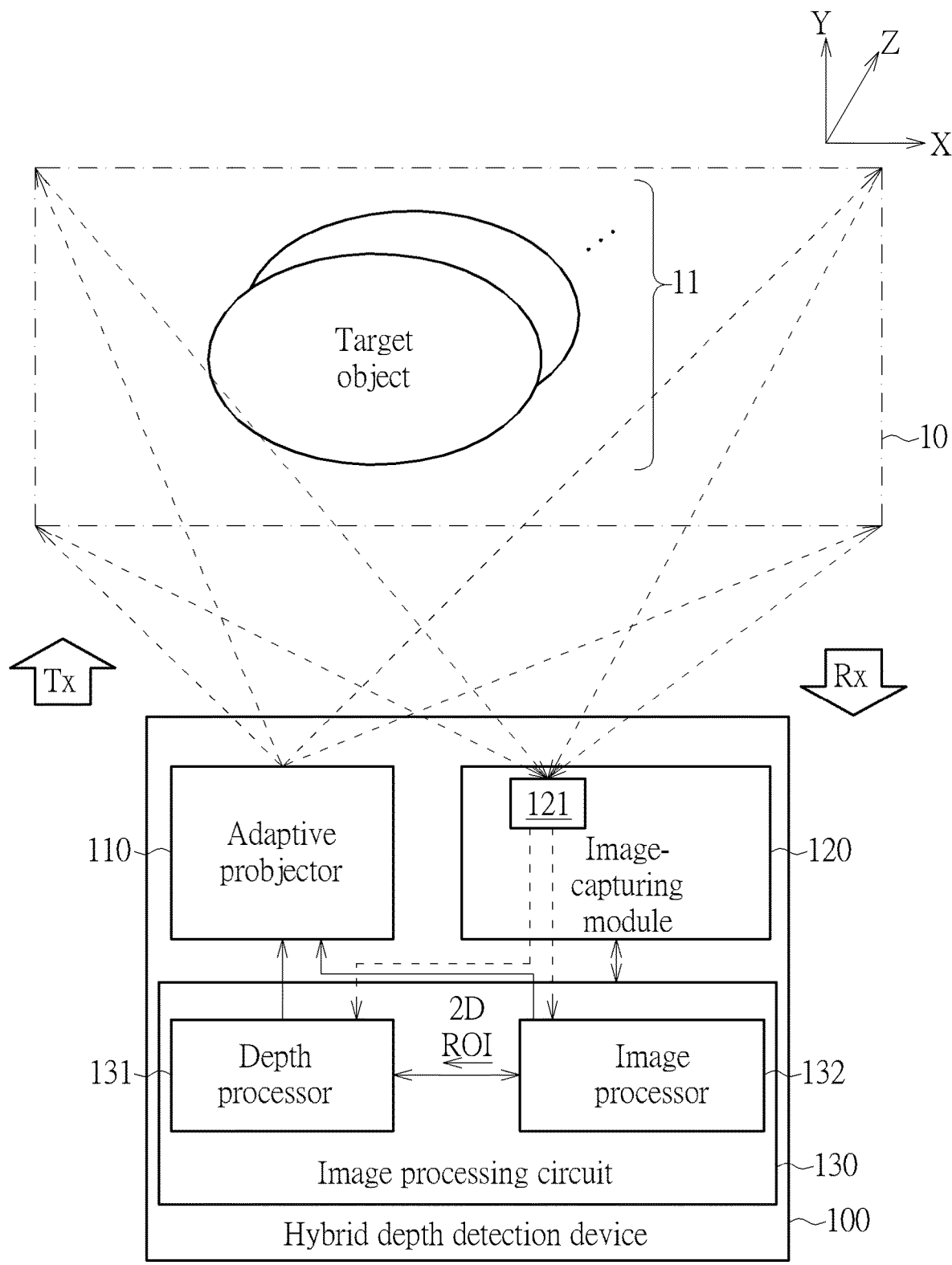
FIG. 1 is a diagram of a hybrid depth detection device according to an embodiment of the present invention.

FIG. 1 is a diagram of a hybrid depth detection device 100 according to an embodiment of the present invention, where the hybrid depth detection device 100 and the adaptive projector 110 therein can be taken as examples of the hybrid depth detection device and the adaptive projector mentioned above, respectively. For better comprehension, a field 10 and one or more target objects 11 may be illustrated with reference to the X-axis, the Y-axis and the Z-axis on the upper half of FIG. 1, but the present invention is not limited thereto. For example, the field 10 (e.g. the shape, the associated sizes and/or the associated angles thereof) and the one or more target objects 11 (e.g. the object count, the shapes, the associated sizes and/or the associated locations thereof) may vary.

As shown in FIG. 1, in addition to the adaptive projector 110, the hybrid depth detection device 100 may further comprise an image-capturing module 120 and an image processing circuit 130, where the adaptive projector 110 and the image-capturing module 120 are coupled to the image processing circuit 130. For example, the image-capturing module 120 may comprise at least one camera (e.g. one or more cameras) such as a camera 121, and the image processing circuit 130 may comprise at least one processor (e.g. one or more processors) such as a depth processor 131 and an image processor 132 respectively corresponding to depth-related processing and 2D image processing, but the present invention is not limited thereto. In some embodiments, the depth processor 131 and the image processor 132 may be integrated into the same processor.

The adaptive projector 110 can be arranged to project one or more predetermined patterns of invisible light (e.g. infrared (IR) or lights of other wavebands). For example, a laser module within the adaptive projector 110 may comprise a light emitter and some optical components, where the light emitter may comprise a vertical-cavity surface-emitting laser (VCSEL) array, for emitting invisible light, and the optical components may comprise a diffractive optical element (DOE), a micro-lens array, a wafer-level optics (WLO) component, for generating the one or more predetermined patterns. More particularly, the WLO component may comprise at least one wafer-level lens (e.g. one or more wafer-level lenses). In addition, the adaptive projector 110 may further comprise one or more electrically-controlled optical components such as at least one liquid crystal (LC) lens (e.g. one or more LC lenses, any of which may be positioned within or outside the laser module), for changing (e.g. narrowing or expanding) one or more projection fields of the one or more predetermined patterns and/or switching between different types of projection (e.g. a first projection type regarding pattern projection of the one or more predetermined patterns, and a second projection type regarding non-pattern projection of no pattern).

For better comprehension, multiple light transmitting (Tx) paths from the adaptive projector 110 to the field 10 (e.g. invisible light Tx paths of invisible light from the adaptive projector 110 to the field 10) may be collectively expressed with the Tx direction (labeled "Tx" for brevity), and multiple light receiving (Rx) paths from the field 10 to the camera 121 (e.g. invisible light Rx paths of invisible light from the one or more target objects 11 to the camera 121) may be collectively expressed with the Rx direction (labeled "Rx" for brevity).

During the depth detection such as the hybrid depth detection, the hybrid depth detection device 100 (e.g. the components therein) can perform the following operations:

(1) the camera 121 can capture an image, where the image comprises image contents indicating one or more objects (e.g. the one or more target objects 11), and the image typically does not have depth information, and may represent a 2D image;

(2) the image processing circuit 130 (e.g. a first partial circuit thereof, such as the image processor 132) can determine a region-of-interest (ROI) of the image captured by the camera 121 (e.g. a region of a human face, such as a region enclosing the face of the person mentioned above on this image) according to the image contents of this image, for further processing of the image processing circuit 130 (e.g. a second partial circuit thereof);

(3) the image processing circuit 130 (e.g. the second partial circuit thereof, such as the depth processor 131) can perform projection type selection to determine at least one selected projection type (e.g. one or more selected projection types) corresponding to a selected distance range among multiple predetermined projection types (e.g. the first projection type and the second projection type), where according to distance information obtained in advance, the distance range can be selected from multiple predetermined distance ranges regarding the distance between the hybrid depth detection device 100 and the one or more target objects 11, and the at least one selected projection type can be selected from the multiple predetermined projection types;

(4) the adaptive projector 110 can perform projection of the at least one selected projection type, and more particularly, perform projection of the multiple predetermined projection types (e.g. the first projection type and the second projection type), such as the pattern projection and the non-pattern projection, to capture corresponding images with the camera 121, respectively, where the non-pattern projection can be designed to generate uniform/quasi-uniform illumination or partial-uniform illumination (e.g. flood-type illumination, as uniform as possible);

(5) the image processing circuit 130 (e.g. the second partial circuit such as the depth processor 131) can perform at least one type of depth detection (e.g. one or more types of depth detection) corresponding to the at least one selected projection type among multiple types of depth detection (e.g. first depth detection corresponding to the first projection type, such as pattern-detection-type depth detection, and second depth detection corresponding to the second projection type, such as Time-of-Flight (TOF)-type depth detection), and more particularly, perform the multiple types of depth detection (e.g. the first depth detection such as the pattern-detection-type depth detection, and the second depth detection such as the TOF-type depth detection) according to the corresponding images to generate a first depth map and a second depth map, respectively, where the first depth map and the second depth map can be regarded as intermediate depth maps; and (6) the image processing circuit 130 (e.g. the second partial circuit such as the depth processor 131) can perform depth data combination according to the first depth map and the second depth map to generate a combined depth map such as a weighted depth map;

where the depth data combination can be performed with reference to the distance range, the distance between the hybrid depth detection device 100 and the one or more target objects 11 as indicated by the distance information, and/or the ROI.

For example, the image processing circuit 130 (e.g. the second partial circuit of the image processing circuit 130, such as the depth processor 131) can determine the respective weighting values of the first depth map and the second depth map according to the distance range, and more particularly, can adjust (e.g. fine-tune) the respective weighting values of the first depth map and the second depth map in a depth-by-depth/pixel-by-pixel manner with respect to a predetermined region within the weighted depth map, for enhancing the depth accuracy at the edges of the one or more objects and generating the weighted depth map accurately and efficiently, but the present invention is not limited thereto. For example, the predetermined region may comprise the whole of the weighted depth map. In some examples, the predetermined region may comprise a portion of the weighted depth map, such as a first adjustment region (e.g. a first fine-tuning region) corresponding to the ROI within the weighted depth map, a second adjustment region (e.g. a second fine-tuning region) corresponding to a sub-region of the ROI within the weighted depth map, etc.

As the one or more depth maps such as the target depth map, the at least one depth map such as the any depth map, etc. can be generated in the same manner as that of the combined depth map such as the weighted depth map, the hybrid depth detection device 100 can perform the hybrid depth detection accurately and efficiently.

Some implementation details regarding the architecture shown in FIG. 1 can be further described as follows. For example, the first partial circuit of the image processing circuit 130, such as the image processor 132, can generate ROI information indicating the ROI, such as 2D ROI information indicating the ROI of the 2D image (labeled "2D ROI" in FIG. 1 for better comprehension). In addition, the second partial circuit of the image processing circuit 130, such as the depth processor 131, can obtain the ROI information indicating the ROI from the first partial circuit such as the image processor 132, and therefore can be notified of the ROI, for performing the associated processing such as adjusting (e.g. fine-tuning) the weighting values of the intermediate depth maps as mentioned above. Additionally, the hybrid depth detection device 100 can utilize the image processing circuit 130 (e.g. the depth processor 131) to generate one or more control signals for controlling the adaptive projector 110. For example, one or more driving circuits within the image processing circuit 130 can be arranged to generate the one or more control signals under control of the depth processor 131, for controlling (e.g. driving) the adaptive projector 110, where the one or more control signals may carry projection type information indicating the at least one selected projection type (e.g. the first projection type and/or the second projection type), for notifying the adaptive projector 110 of the at least one selected projection type.

As the hybrid depth detection device 100 (e.g. the components therein, such as the adaptive projector 110, the image processing circuit 130, and the depth processor 131) can operate according to the method, the hybrid depth detection device 100 can perform the hybrid depth detection accurately and efficiently to generate the one or more depth maps, such as the depth maps of the human faces, to make the electronic product equipped with the hybrid depth detection device 100 perform the 3D face recognition according to the one or more depth maps accurately and efficiently. As a result, the overall performance can be enhanced.

According to some embodiments, the image processing circuit 130 (e.g. the depth processor 131) can calculate a set of depths of the first depth map according to the difference between a projection result of a predetermined pattern (e.g. any of the one or more predetermined patterns) and the predetermined pattern, where the projection result may indicate the variation of the predetermined pattern due to non-planar surface of the human face. More particularly, the predetermined pattern may comprise a plurality of sub-patterns (e.g. a plurality of invisible-light tiles), and based on the knowledge of the associated geometric relationships, the image processing circuit 130 (e.g. the depth processor 131) can calculate the set of depths according to the displacements of some sub-patterns (e.g. some invisible-light tiles) among the plurality of sub-patterns (e.g. the plurality of invisible-light tiles) of the predetermined pattern, since the depth variations in the set of depths may correspond to the displacements.

Regarding the depth calculations of the set of depths as described above, when a baseline between the center of the adaptive projector 110 (e.g. the location of an optical axis of the optical components on a reference plane on the hybrid depth detection device 100) and the center of the image-capturing module 120 (e.g. the location of the optical axis of the camera 121 on the reference plane) is much shorter than the distance between the hybrid depth detection device 100 and the one or more target objects 11 (e.g. the ratio of the length of the baseline to this distance is less than a predetermined ratio), the image processing circuit 130 (e.g. the depth processor 131) can omit the baseline in the depth calculations, where the length of the baseline can be forcibly set as zero, but the present invention is not limited thereto. In a situation where the baseline is considered, the image processing circuit 130 (e.g. the depth processor 131) can use the real value of the length of the baseline in the depth calculations.

According to some embodiments, the predetermined pattern can be implemented by way of structured-light (SL) technology, etc., where the pattern-detection-type depth detection can be referred to as the SL-type depth detection, but the present invention is not limited thereto. In addition, during the pattern-detection-type depth detection such as the SL-type depth detection, the image processing circuit 130 (e.g. the depth processor 131) can use the displacements as the reference of the depth calculations, but the present invention is not limited thereto. For example, during the TOF-type depth detection, the image processing circuit 130 (e.g. the depth processor 131) can use phase or time differences of light pulses arriving at pixels on the image sensor of the camera 121 as indicators of the distances in the imaging system from the field 10 to the camera 121, to perform the depth calculations.

Figure 2:
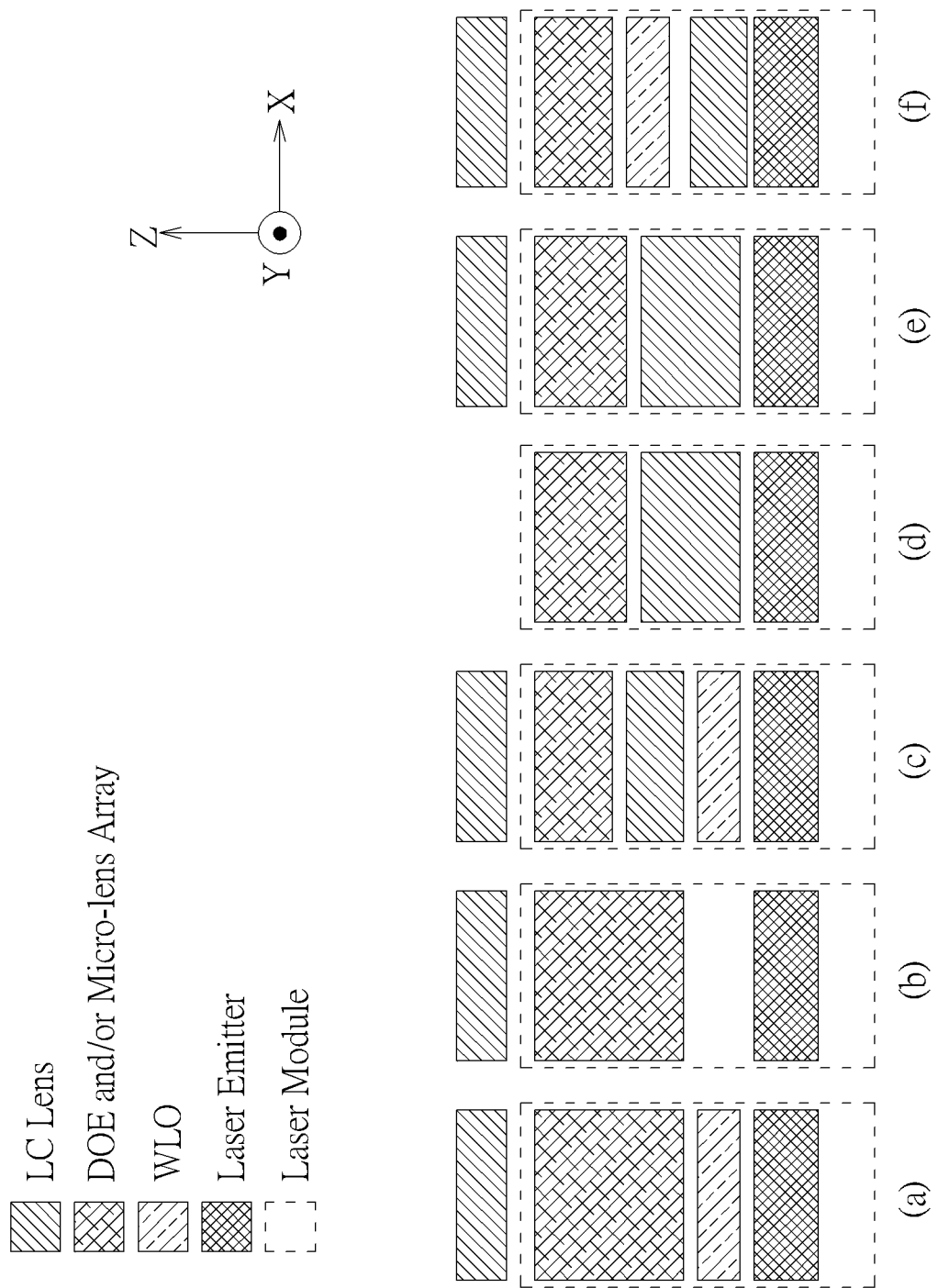
FIG. 2 illustrates some implementation details of the adaptive projector shown in FIG. 1 according to an embodiment of the present invention.

FIG. 2 illustrates some implementation details of the adaptive projector 110 shown in FIG. 1 according to an embodiment of the present invention. The adaptive projector 110 can be implemented by way of various combinations of different sets of components, such as that illustrated in Cases (a), (b), (c), (d), (e) and (f) shown in FIG. 2:

(a) the at least one LC lens comprises a LC lens positioned outside of the laser module, and the WLO component is positioned between the DOE/micro-lens array and the laser emitter;

(b) the at least one LC lens comprises a LC lens positioned outside of the laser module, and no WLO component is used;

(c) in a Type-1 configuration, the at least one LC lens comprises a first LC lens positioned outside of the laser module and a second LC lens positioned within the laser module, the DOE/micro-lens array is positioned between the first LC lens and the second LC lens, and the WLO component is positioned between the second LC lens and the laser emitter;

(d) the at least one LC lens comprises a LC lens positioned within the laser module, between the DOE/micro-lens array and the laser emitter, and no WLO component is used;

(e) the at least one LC lens comprises a first LC lens positioned outside of the laser module and a second LC lens positioned within the laser module, between the DOE/micro-lens array and the laser emitter, and no WLO component is used; and (f) in a Type-2 configuration, the at least one LC lens comprises a first LC lens positioned outside of the laser module and a second LC lens positioned within the laser module, the DOE/micro-lens array is positioned between the first LC lens and the WLO component, and the second LC lens is positioned between the WLO component and the laser emitter;

but the present invention is not limited thereto. For example, as long as similar results can be achieved, some components may be integrated into the same component and/or one or more components may be added, removed, or changed.

According to some embodiments, the laser emitter may comprise at least one invisible-light source (e.g. one or more invisible-light sources), such as the VCSEL array, edge-emitting laser diodes (LDs), etc. In addition to the at least one invisible-light source, the laser emitter may further comprise a beam limiting device (e.g. a collimator lens). The beam limiting device can receive the emitted invisible-light from the at least one invisible-light source and convert the emitted invisible-light into beam-limited invisible-light. For brevity, similar descriptions for these embodiments are not repeated in detail here.

According to some embodiments, any LC lens of the at least one LC lens (e.g. any of the LC lenses shown in FIG. 2) can be implemented by way of multiple LC lens components (e.g. LC lens components that are aligned to the optical axis of this LC lens and are positioned in predetermined locations according to the optical design of this LC lens, which can be referred to as cascaded LC lens components for brevity), but the present invention is not limited thereto. In some embodiments, the any LC lens can be implemented by way of a single LC lens component (e.g. a compact LC lens component that is designed to have all optical features as required for this LC lens).

Regarding any type of projection among the multiple predetermined projection types (e.g. the first projection type and the second projection type), the image processing circuit 130 (e.g. the second partial circuit such as the depth processor 131) can control the adaptive projector 110 (e.g. a certain LC lens among the at least one LC lens) to change (e.g. narrow or expand) the projection field of this type of projection. For example, when this type of projection represent the first projection type regarding the pattern projection of the one or more predetermined patterns, the image processing circuit 130 (e.g. the second partial circuit such as the depth processor 131) can control the adaptive projector 110 (e.g. this LC lens) to change (e.g. narrow or expand) the projection field of the pattern projection; and when this type of projection represent the second projection type regarding the non-pattern projection of no pattern, the image processing circuit 130 (e.g. the second partial circuit such as the depth processor 131) can control the adaptive projector 110 (e.g. this LC lens) to change (e.g. narrow or expand) the projection field of the non-pattern projection; but the present invention is not limited thereto. In some embodiments, the image processing circuit 130 (e.g. the second partial circuit such as the depth processor 131) can control the adaptive projector 110 (e.g. this LC lens) to change the projection field of only one type of projection (e.g. the second projection type regarding the non-pattern projection) among the multiple predetermined projection types, rather than controlling the adaptive projector 110 (e.g. this LC lens) to change the projection field of all types of projection among the multiple predetermined projection types. For example, the TOF-type depth detection can achieve better depth detection accuracy than the pattern-detection-type depth detection for a normal/long-distance target object at a normal distance or long distances (e.g. distances greater than the normal distance), and the pattern-detection-type depth detection can achieve very high depth detection accuracy for a short-distance target object at a short distance (e.g. a distance shorter than the normal distance) except for object edges of the short-distance target object. The image processing circuit 130 (e.g. the second partial circuit such as the depth processor 131) can trigger the non-pattern projection and perform the TOF-type depth detection on the normal/long-distance target object to achieve the aforementioned better depth detection accuracy. In addition, the image processing circuit 130 (e.g. the second partial circuit such as the depth processor 131) can trigger the pattern projection and perform the pattern-detection-type depth detection on the short-distance target object to achieve the aforementioned very high depth detection accuracy, and further trigger the non-pattern projection and perform the TOF-type depth detection on the short-distance target object to adjust (e.g. fine-tune) some depths at the object edges of the short-distance target object, in order to enhance the depth detection accuracy for the object edges of the short-distance target object. Therefore, the present invention method and associated apparatus can enhance overall performance without introducing any side effect or in a way that is less likely to introduce a side effect.

According to some embodiments, one or more components (e.g. one or more of the DOE, the micro-lens array, and the WLO component) within the adaptive projector 110 can be designed to perform the pattern projection in a narrower projection field, and the image processing circuit 130 (e.g. the depth processor 131) can control the adaptive projector 110 (e.g. the LC lens) to convert the pattern projection into the non-pattern projection in the narrower projection field, but the present invention is not limited thereto. For example, one or more components (e.g. one or more of the DOE, the micro-lens array, and the WLO component) within the adaptive projector 110 can be designed to perform the pattern projection in a wider projection field, and the image processing circuit 130 (e.g. the depth processor 131) can control the adaptive projector 110 (e.g. the LC lens) to convert the pattern projection into the non-pattern projection in the wider projection field.

Figure 3:
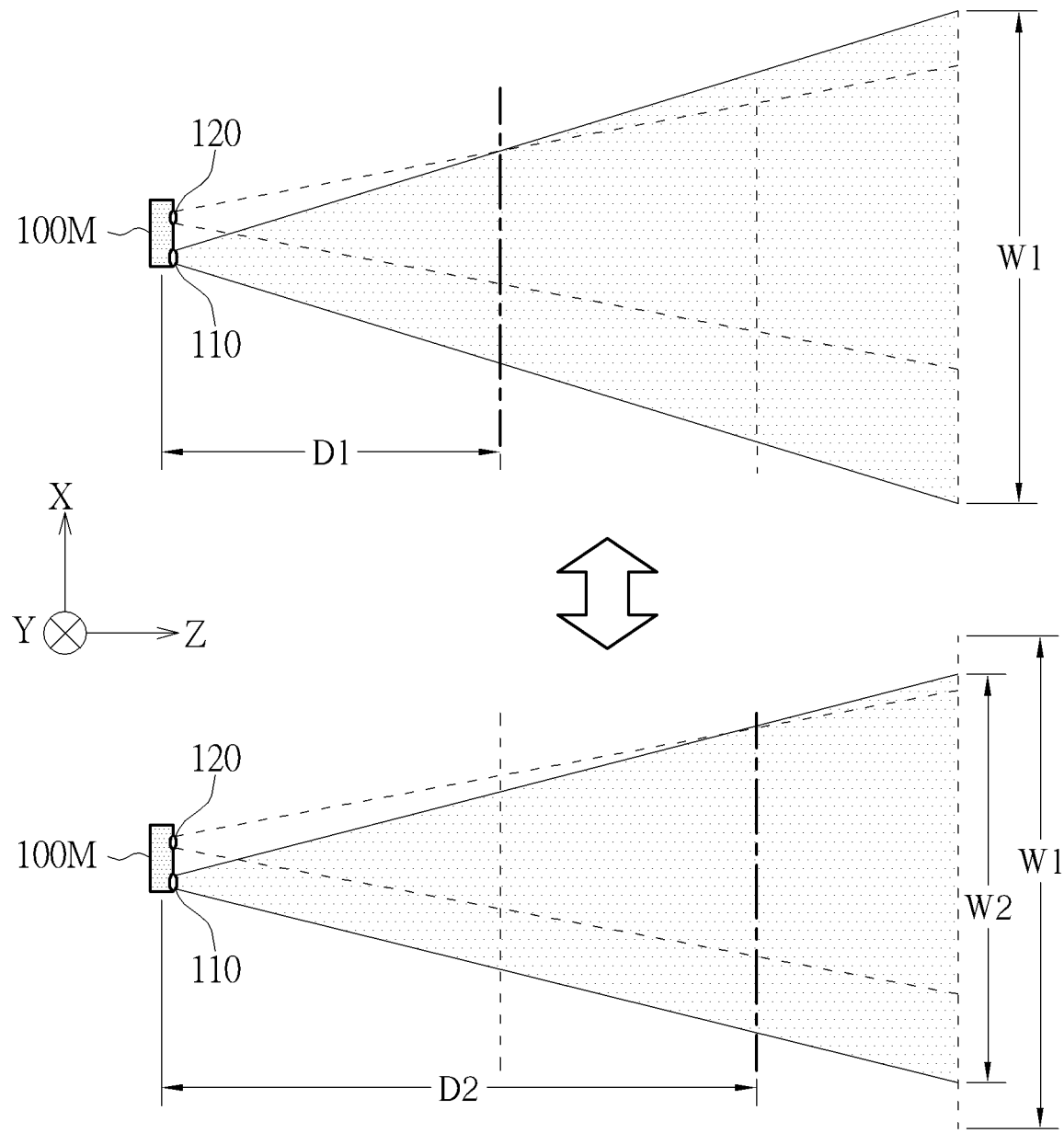
FIG. 3 illustrates an adaptive field control scheme of a method for performing light shaping with aid of the adaptive projector according to an embodiment of the present invention.

FIG. 3 illustrates an adaptive field control scheme of the method for performing light shaping with aid of the adaptive projector according to an embodiment of the present invention. For better comprehension, the hybrid depth detection device 100 (e.g. the components therein, such as the adaptive projector 110 and the image-capturing module 120) can be integrated into the electronic product 100M such as the mobile device, etc., and can operate with some parameters (e.g. the distances D1 and D2, the widths W1 and W2, and the associated angles) according to the adaptive field control scheme as shown in FIG. 3, where the distances D1 and D2 may represent a minimum working distance and the normal distance, respectively, and the short distance may fall within the range of the interval [D1, D2]. These parameters (e.g. the distances D1 and D2, the widths W1 and W2, and the associated angles) and the size and the shape of the electronic product 100M are for illustrative purposes only, and should not be regarded as a limitation of the present invention. In some embodiments, these parameters and the size and the shape of the electronic product 100M may vary.

As shown in the upper half of FIG. 3, the image processing circuit 130 (e.g. the second partial circuit such as the depth processor 131) can trigger the pattern projection and perform the pattern-detection-type depth detection on the short-distance target object, where the image processing circuit 130 (e.g. the second partial circuit such as the depth processor 131) can control the adaptive projector 110 (e.g. this LC lens) to use a fixed projection field during performing the pattern projection. In addition, the image processing circuit 130 (e.g. the second partial circuit such as the depth processor 131) can trigger the non-pattern projection and perform the TOF-type depth detection on the short-distance target object to adjust (e.g. fine-tune) the depths at the object edges of the short-distance target object, where the projection field of the non-pattern projection is changeable when there is a need. As shown in the lower half of FIG. 3, the image processing circuit 130 (e.g. the second partial circuit such as the depth processor 131) can trigger the non-pattern projection and perform the TOF-type depth detection on the normal/long-distance target object. For brevity, similar descriptions for this embodiment are not repeated in detail here.

Figure 4:
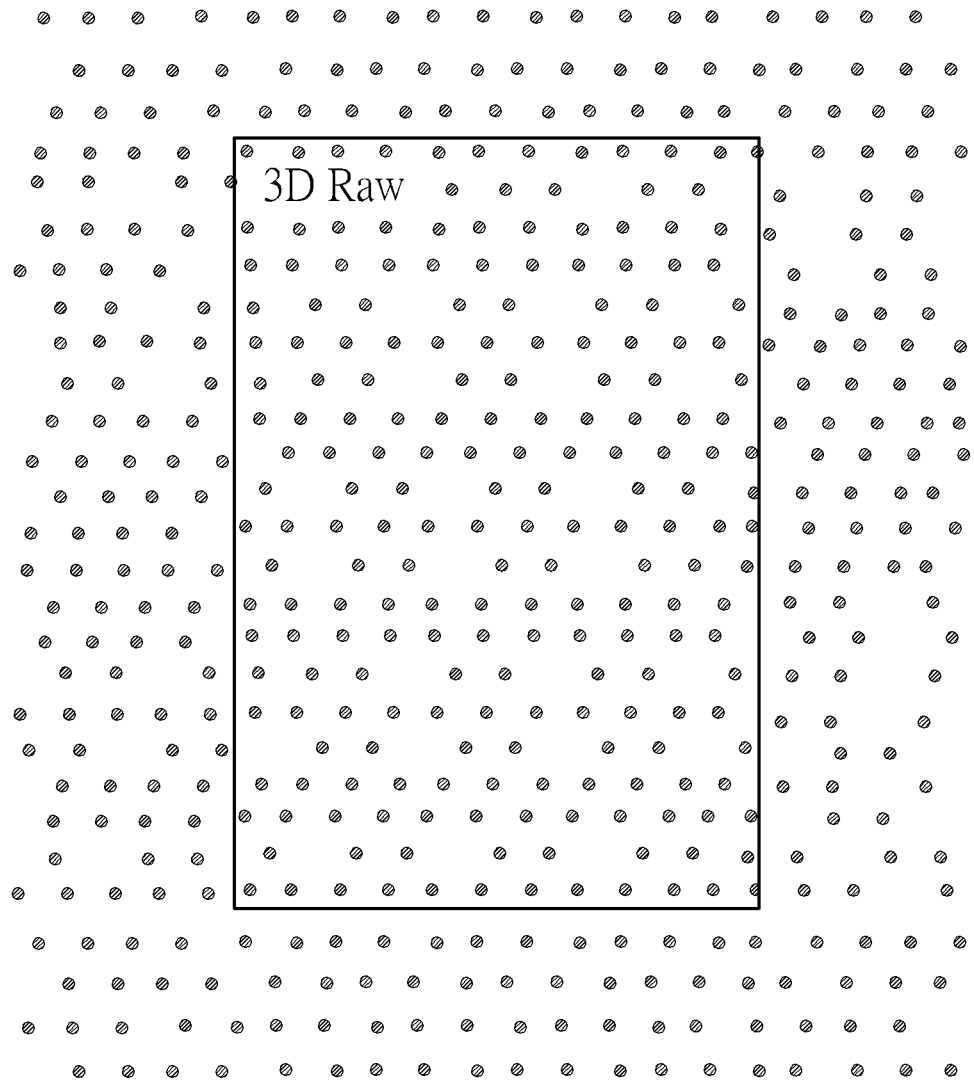
FIG. 4 illustrates a projection result of pattern projection in an adaptive projection-type control scheme of the method according to an embodiment of the present invention.

FIG. 4 illustrates a projection result of the pattern projection in an adaptive projection-type control scheme of the method according to an embodiment of the present invention. For better comprehension, assume that the short-distance target object is a planar target, but the present invention is not limited thereto. In addition, the short distance may be greater than the distance D1, and more particularly, may fall within the range of the interval (D1, D2). The pattern-adjustable projector 110 can be designed to project the predetermined pattern with fixed projection field. When being projected as the projection result, the plurality of sub-patterns (e.g. the plurality of invisible-light tiles) of the predetermined pattern, such as the spots shown in FIG. 4, can distribute over the fixed projection field. The image processing circuit 130 (e.g. the second partial circuit such as the depth processor 131) can utilize the camera 121 to capture a 3D raw image (labeled "3D Raw" for brevity), for performing the pattern-detection-type depth detection, where the 3D raw image may comprise at least one portion (e.g. a portion or all) of the projection result. For brevity, similar descriptions for this embodiment are not repeated in detail here.

According to some embodiments, the image processing circuit 130 (e.g. the second partial circuit such as the depth processor 131) can control the adaptive projector 110 (e.g. a certain LC lens among the at least one LC lens) to switch between the multiple projection types (e.g. the first projection type regarding the pattern projection of the one or more predetermined patterns, and the second projection type regarding the non-pattern projection of no pattern). For example, the DOE, the micro-lens array, and/or the WLO component can be arranged to generate the one or more predetermined patterns. When it is needed to switch from the first projection type to the second projection type, under control the image processing circuit 130 (e.g. the second partial circuit such as the depth processor 131), the adaptive projector 110 (e.g. this LC lens) can temporarily disable the function of generating the one or more predetermined patterns, for example, by changing a focal length of this LC lens to prevent the one or more predetermined patterns from being outputted via predetermined imaging paths in an optical design regarding the imaging system (e.g. the DOE, the micro-lens array, and/or the WLO component), to make the pattern projection become the non-pattern projection. When it is needed to switch from the second projection type to the first projection type, under control the image processing circuit 130 (e.g. the second partial circuit such as the depth processor 131), the adaptive projector 110 (e.g. this LC lens) can enable the function of generating the one or more predetermined patterns, for example, by changing the focal length of this LC lens back to a predetermined focal length value in this optical design, to make the non-pattern projection become the pattern projection. For brevity, similar descriptions for these embodiments are not repeated in detail here.

Figure 5:
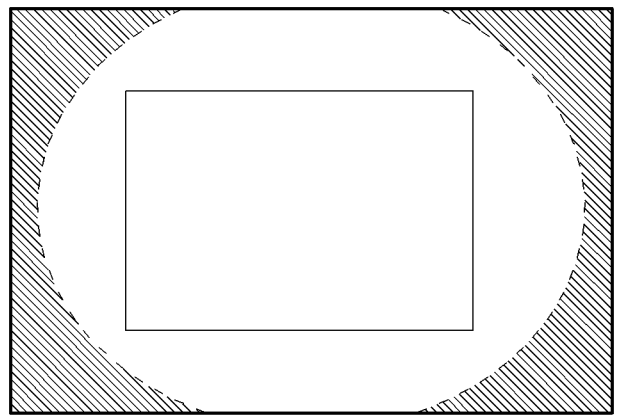
FIG. 5 illustrates some projection results of non-pattern projection in the adaptive projection-type control scheme according to an embodiment of the present invention.
Figure 5:
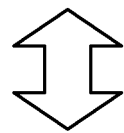
Figure 5:
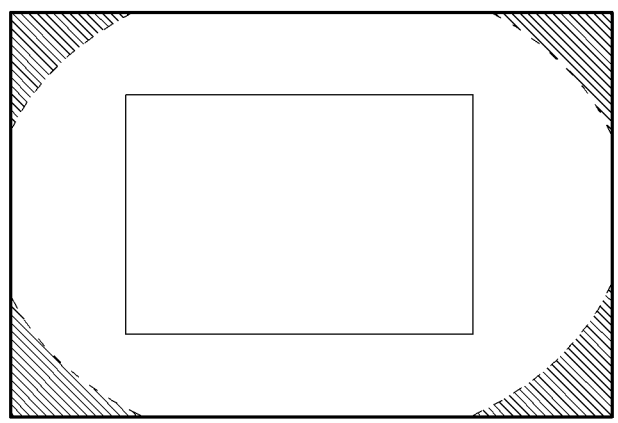

FIG. 5 illustrates some projection results of the non-pattern projection in the adaptive projection-type control scheme according to an embodiment of the present invention. For better comprehension, assume that the short-distance target object and the normal/long-distance target object are planar targets, but the present invention is not limited thereto. In addition, the projection result shown in the left half of FIG. 5 can be taken as an example of the projection result of the non-pattern projection for the short-distance target object at the short distance, and the projection result shown in the right half of FIG. 5 can be taken as an example of the projection result of the non-pattern projection for the normal/long-distance target object at the normal distance or long distances, where the shaded portions may indicate that the illumination uniformity at the corners or the outer areas is not as good as that at the center. When it is needed to perform the TOF-type depth detection on the normal/long-distance target object, the image processing circuit 130 (e.g. the second partial circuit such as the depth processor 131) can control the adaptive projector 110 (e.g. the LC lens) to change (e.g. narrow) the projection field of the non-pattern projection, to make the projection result of the non-pattern projection have narrower distribution with higher intensity within a corresponding projection field as shown in the right half of FIG. 5. When it is needed to perform the TOF-type depth detection on the short-distance target object, the image processing circuit 130 (e.g. the second partial circuit such as the depth processor 131) can control the adaptive projector 110 (e.g. the LC lens) to change (e.g. expand) the projection field of the non-pattern projection, to make the projection result of the non-pattern projection have wider and more uniform distribution over a corresponding projection field as shown in the left half of FIG. 5. For brevity, similar descriptions for this embodiment are not repeated in detail here.

Figure 6:
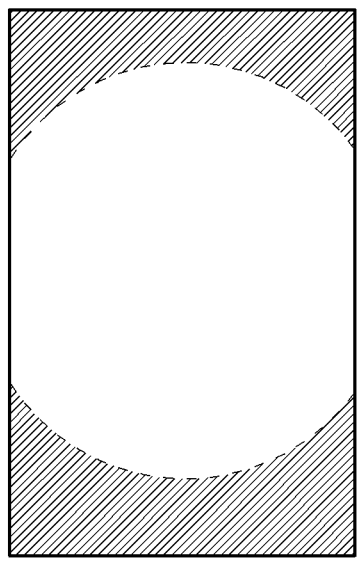
FIG. 6 illustrates a non-pattern projection and face detection control scheme of the method according to an embodiment of the present invention.
Figure 6:
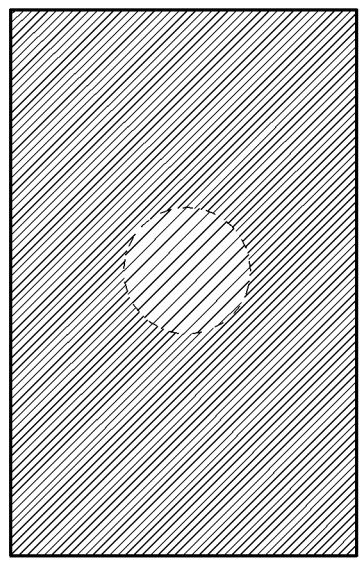
Figure 6:
Figure 6:
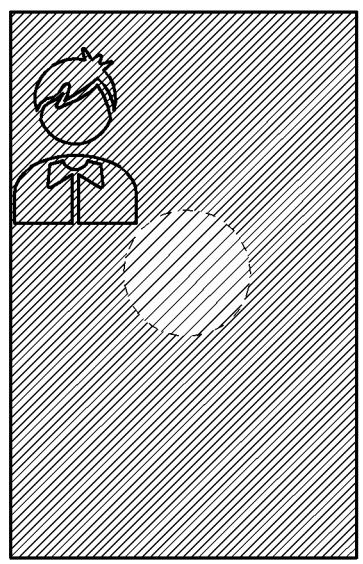

FIG. 6 illustrates a non-pattern projection and face detection control scheme of the method according to an embodiment of the present invention. For better comprehension, assume that any target object among the short-distance target object, the normal-distance target object and the long-distance target object may comprise planar targets, but the present invention is not limited thereto. In addition, as shown in the upper half of FIG. 6, the projection result as illustrated with Case (a) can be taken as an example of the projection result of the non-pattern projection for the short/normal-distance target object at the short distance or the normal distance, and the projection result as illustrated with Case (b) can be taken as an example of the projection result of the non-pattern projection for the long-distance target object at the long distances, where the shaded portions may indicate that the illumination uniformity at the corners or the outer areas is not as good as that at the center, and the overall illumination may decrease when the distance between the hybrid depth detection device 100 and the one or more target objects 11 increases, which means the 2D images captured at the long distances may be dimmer than that captured at the short distance or the normal distance.

When it is needed to perform the 2D face detection according to the 2D image(s), for example, for generating the ROI information indicating the ROI, such as the 2D ROI information indicating the ROI of the 2D image (labeled "2D ROI" in FIG. 1 for better comprehension), the image processing circuit 130 (e.g. the first partial circuit such as the image processor 132) can control the adaptive projector 110 to perform the non-pattern projection, and control the camera 121 to capture the 2D image(s), for performing the 2D face detection, where the 2D image(s) may comprise at least one portion (e.g. a portion or all) of the projection result. As shown in the lower half of FIG. 6, the image processing circuit 130 (e.g. the first partial circuit such as the image processor 132) may perform the 2D face detection on the 2D image(s) (e.g. the person among the one or more target objects 11 thereon, such as the person in front of the hybrid depth detection device 100 as well as the adaptive projector 110 and the camera 121 thereof in the real space) to obtain different detection results in Cases (c) and (d), respectively. For example, the image processing circuit 130 (e.g. the first partial circuit such as the image processor 132) may perform the 2D face detection to generate a face detection result successfully in Case (c), but may be unable to successfully detect the face of the person due to insufficient illumination at the corners or the outer areas in Case (d), where the projection results for the planar targets as illustrated with Cases (c) and (d) may be similar to the projection result as illustrated with Case (b), respectively, and should be the same as the projection result as illustrated with Case (b) if the person were absent in Cases (c) and (d), respectively.

Figure 7:
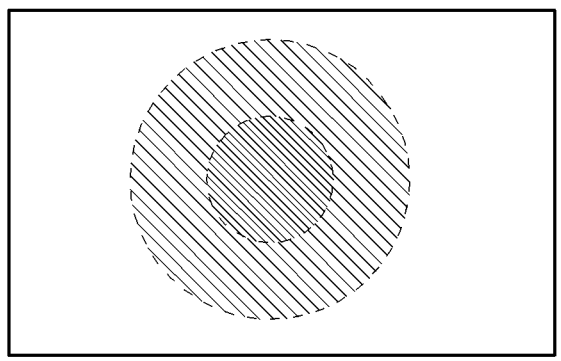
FIG. 7 illustrates a light-shaped non-pattern projection control scheme of the method according to an embodiment of the present invention.
Figure 7:
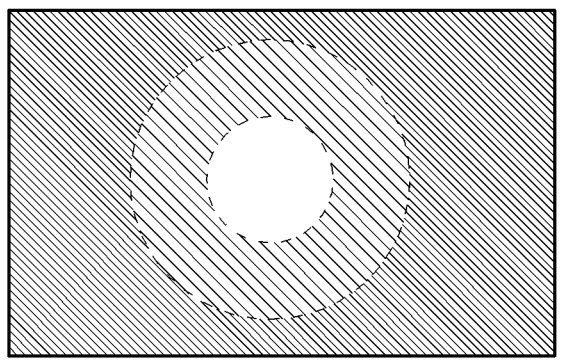
Figure 7:
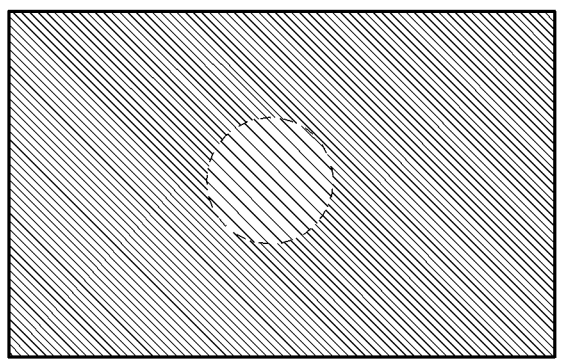

FIG. 7 illustrates a light-shaped non-pattern projection control scheme of the method according to an embodiment of the present invention. For better comprehension, assume that any target object among the short-distance target object, the normal-distance target object and the long-distance target object may comprise planar targets, but the present invention is not limited thereto. In addition, the projection result for the planar target as illustrated with Case (a) shown in FIG. 7 may be the same as the projection result as illustrated with Case (b) shown in FIG. 6. The image processing circuit 130 (e.g. the first partial circuit such as the image processor 132) can control the adaptive projector 110 (e.g. the LC lens) to perform light shaping, and more particularly, change (e.g. narrow) the projection field of the non-pattern projection by changing a first control signal among the one or more control signals, to make the projection result of the non-pattern projection have much narrower distribution with higher intensity within the corresponding projection field as illustrated with Case (b) shown in FIG. 7, where the effective focal length of the adaptive projector 110 (e.g. the LC lens) may vary with respect to the first control signal (e.g. a control voltage thereof), but the present invention is not limited thereto. According to some embodiment, the first control signal may carry effective focal length information indicating the effective focal length, for controlling the adaptive projector 110 (e.g. the LC lens) to perform the light shaping in the non-pattern projection.

The image processing circuit 130 (e.g. the first partial circuit such as the image processor 132) can control the adaptive projector 110 (e.g. the LC lens) to perform the light shaping to switch from Case (a) to Case (b) as shown in FIG. 7, for example, by changing the first control signal (e.g. increasing or decreasing the control voltage thereof), to guarantee sufficient illumination at the center as illustrated with Case (b), for performing the 2D face detection to generate a face detection result successfully, but the present invention is not limited thereto. The image processing circuit 130 (e.g. the first partial circuit such as the image processor 132) can control the adaptive projector 110 (e.g. the LC lens) to perform the light shaping to further switch from Case (b) to Case (c) as shown in FIG. 7, for example, by further changing the first control signal (e.g. further increasing or further decreasing the control voltage thereof), to guarantee sufficient illumination at the corners or the outer areas as illustrated with Case (c), for performing the 2D face detection to generate a face detection result successfully.

Figure 8:
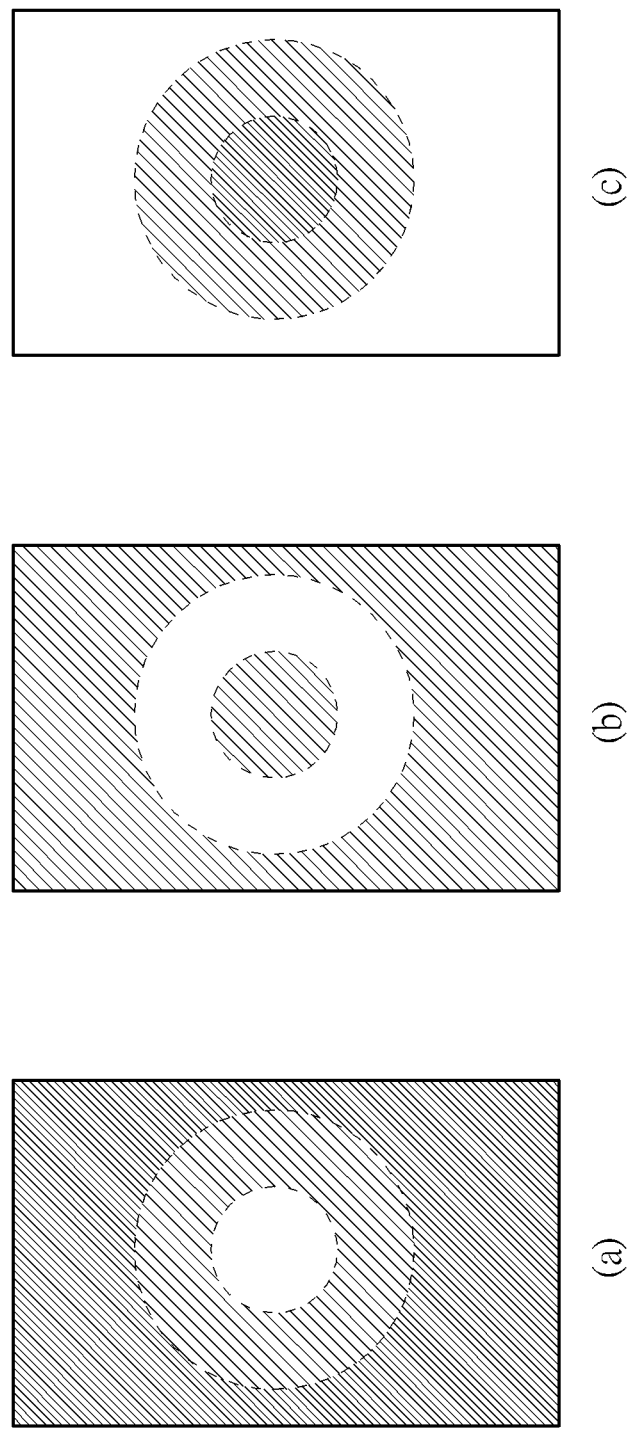
FIG. 8 illustrates a light-shaped non-pattern projection control scheme of the method according to another embodiment of the present invention.

FIG. 8 illustrates a light-shaped non-pattern projection control scheme of the method according to another embodiment of the present invention. For better comprehension, assume that any target object among the short-distance target object, the normal-distance target object and the long-distance target object may comprise planar targets, but the present invention is not limited thereto. In addition, the projection result for the planar target as illustrated with Case (a) shown in FIG. 8 may be the same as the projection result as illustrated with Case (b) shown in FIG. 7, and the projection result for the planar target as illustrated with Case (c) shown in FIG. 8 may be the same as the projection result as illustrated with Case (c) shown in FIG. 7. Under control of the image processing circuit 130 (e.g. the first partial circuit such as the image processor 132), there may be at least one intermediate light-shaping state (e.g. one or more intermediate light-shaping states) between the respective light-shaping states of Cases (a) and (c) shown in FIG. 8, such as the light-shaping state of Case (b) shown in FIG. 8, but the present invention is not limited thereto.

The image processing circuit 130 (e.g. the first partial circuit such as the image processor 132) can control the adaptive projector 110 (e.g. the LC lens) to perform the light shaping to switch from Case (a) to Case (b) as shown in FIG. 8, for example, by changing the first control signal (e.g. increasing or decreasing the control voltage thereof), to guarantee sufficient illumination at a ring-shaped portion (e.g. a donut-like portion) as illustrated with Case (b), for performing the 2D face detection to generate a face detection result successfully, and further switch from Case (b) to Case (c) as shown in FIG. 8, for example, by further changing the first control signal (e.g. further increasing or further decreasing the control voltage thereof), to guarantee sufficient illumination at the corners or the outer areas as illustrated with Case (c), for performing the 2D face detection to generate a face detection result successfully. For brevity, similar descriptions for this embodiment are not repeated in detail here.

According to some embodiments, there may be more than one intermediate light-shaping state between Cases (a) and (c) shown in FIG. 8. More particularly, one or more intermediate cases corresponding to one or more additional intermediate light-shaping states may be inserted between Cases (a) and (b) shown in FIG. 8. The image processing circuit 130 (e.g. the first partial circuit such as the image processor 132) can control the adaptive projector 110 (e.g. the LC lens) to perform the light shaping to switch from Case (a) to the one or more intermediate cases between Cases (a) and (b), for example, by changing the first control signal (e.g. increasing or decreasing the control voltage thereof), to guarantee sufficient illumination at one or more ring-shaped portions (e.g. one or more donut-like portions) smaller than that of Case (b), for performing the 2D face detection to generate one or more face detection results successfully, and further switch from the one or more intermediate cases between Cases (a) and (b) to Case (b), for example, by further changing the first control signal (e.g. further increasing or further decreasing the control voltage thereof), to guarantee sufficient illumination at the ring-shaped portion (e.g. the donut-like portion) as illustrated with Case (b), for performing the 2D face detection to generate one or more face detection results successfully. In addition, one or more intermediate cases corresponding to one or more additional intermediate light-shaping states may be inserted between Cases (b) and (c) shown in FIG. 8. The image processing circuit 130 (e.g. the first partial circuit such as the image processor 132) can control the adaptive projector 110 (e.g. the LC lens) to perform the light shaping to switch from Case (b) to the one or more intermediate cases between Cases (b) and (c), for example, by changing the first control signal (e.g. increasing or decreasing the control voltage thereof), to guarantee sufficient illumination at one or more ring-shaped portions (e.g. one or more donut-like portions) greater than that of Case (b), for performing the 2D face detection to generate one or more face detection results successfully, and further switch from the one or more intermediate cases between Cases (b) and (c) to Case (c), for example, by further changing the first control signal (e.g. further increasing or further decreasing the control voltage thereof), to guarantee sufficient illumination at the corners or the outer areas as illustrated with Case (c), for performing the 2D face detection to generate one or more face detection results successfully. For brevity, similar descriptions for these embodiments are not repeated in detail here.

Figure 9:
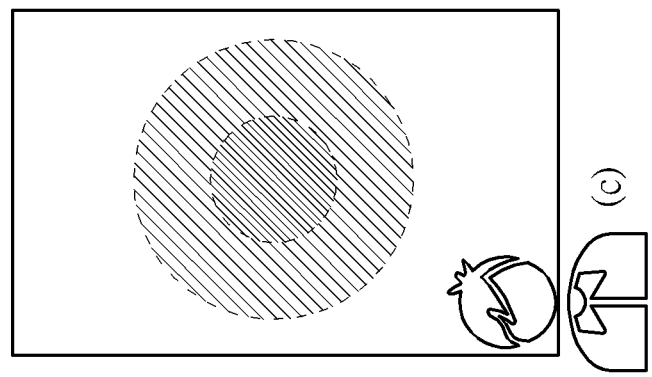
FIG. 9 illustrates a light-shaped non-pattern projection and face detection control scheme of the method according to an embodiment of the present invention.
Figure 9:
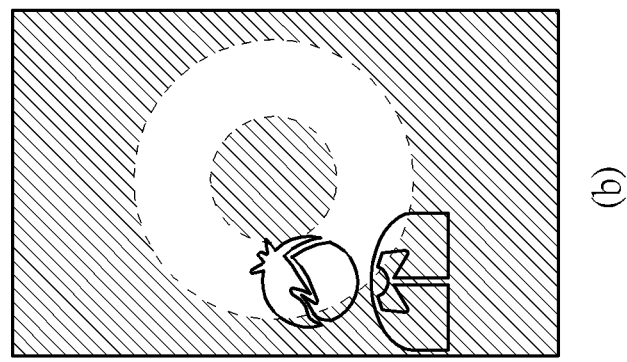
Figure 9:
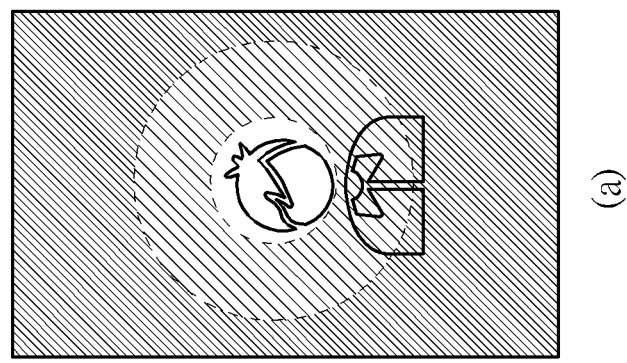

FIG. 9 illustrates a light-shaped non-pattern projection and face detection control scheme of the method according to an embodiment of the present invention. For better comprehension, assume that any target object among the short-distance target object, the normal-distance target object and the long-distance target object may comprise planar targets, but the present invention is not limited thereto. In addition, the projection results for the planar targets as illustrated with Cases (a), (b) and (c) shown in FIG. 9 may be similar to the projection results as illustrated with Cases (a), (b) and (c) shown in FIG. 8, respectively, and should be the same as the projection results as illustrated with Cases (a), (b) and (c) shown in FIG. 8 if the person were absent in Cases (a), (b) and (c), respectively.

As shown in FIG. 9, the image processing circuit 130 (e.g. the first partial circuit such as the image processor 132) may perform the 2D face detection on the 2D image(s) (e.g. the person among the one or more target objects 11 thereon, such as the person in front of the hybrid depth detection device 100 as well as the adaptive projector 110 and the camera 121 thereof in the real space) to obtain multiple detection results (e.g. multiple face detection results) in various cases such as Cases (a), (b) and (c) shown in FIG. 9, respectively. For example, when controlling the adaptive projector 110 (e.g. the LC lens) to perform the light shaping (e.g. by setting the first control signal such as the control voltage thereof) to guarantee sufficient illumination at the center as illustrated with Case (a), the image processing circuit 130 (e.g. the first partial circuit such as the image processor 132) can perform the 2D face detection to generate a face detection result successfully. For another example, when controlling the adaptive projector 110 (e.g. the LC lens) to perform the light shaping (e.g. by setting the first control signal such as the control voltage thereof) to guarantee sufficient illumination at the ring-shaped portion (e.g. the donut-like portion) as illustrated with Case (b), the image processing circuit 130 (e.g. the first partial circuit such as the image processor 132) can perform the 2D face detection to generate a face detection result successfully. For yet another example, when controlling the adaptive projector 110 (e.g. the LC lens) to perform the light shaping (e.g. by setting the first control signal such as the control voltage thereof) to guarantee sufficient illumination at the corners or the outer areas as illustrated with Case (c), the image processing circuit 130 (e.g. the first partial circuit such as the image processor 132) can perform the 2D face detection to generate a face detection result successfully. For brevity, similar descriptions for this embodiment are not repeated in detail here.

Figure 10:
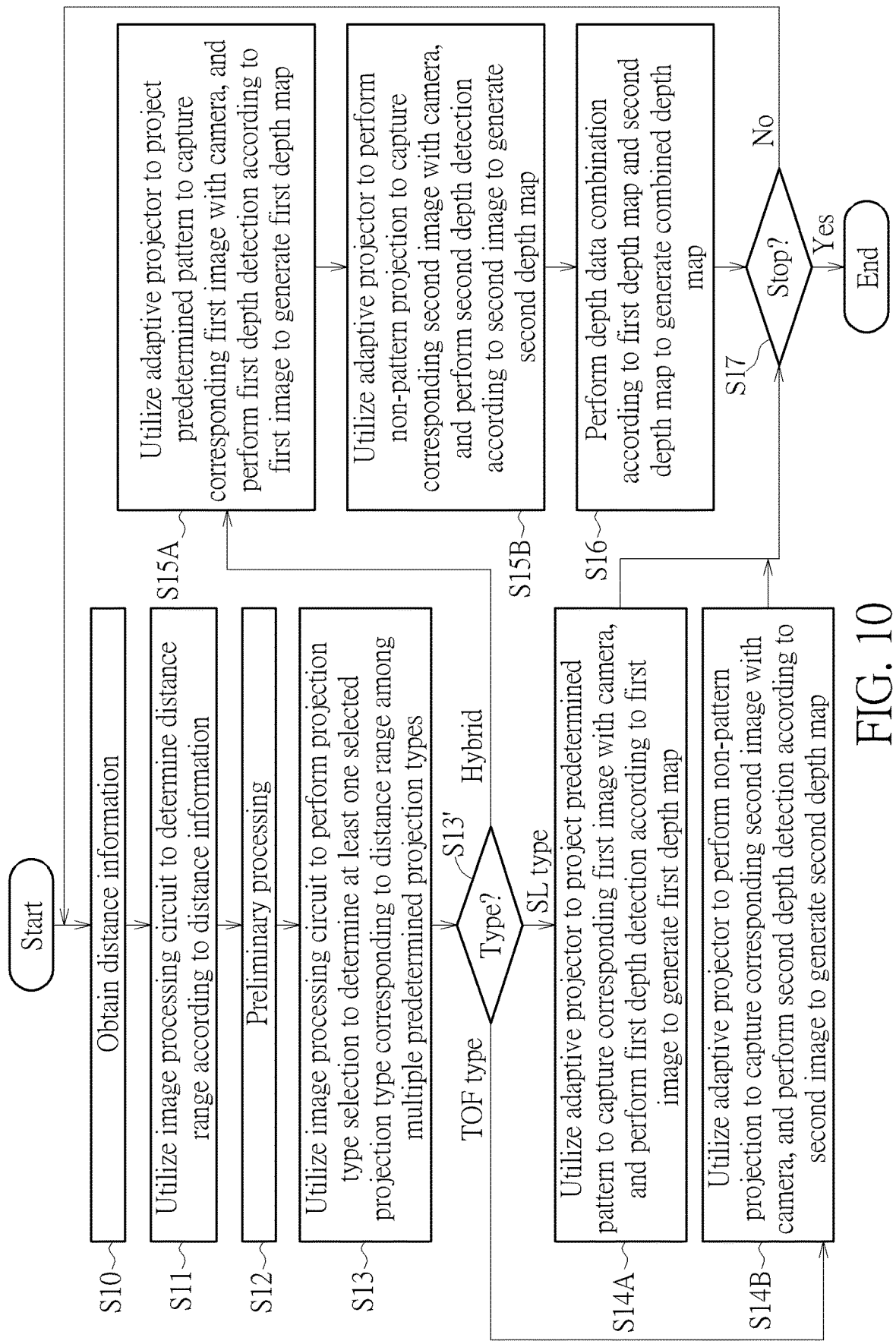
FIG. 10 illustrates a working flow of the method according to an embodiment of the present invention.

FIG. 10 illustrates a working flow of the method according to an embodiment of the present invention. The method may be applied to the associated apparatus (e.g. the hybrid depth detection device 100, the image processing circuit 130, the depth processor 131, and the adaptive projector 110), and may be executed by the apparatus.

In Step S10, the image processing circuit 130 (e.g. the second partial circuit such as the depth processor 131, or the first partial circuit such as the image processor 132) can obtain the distance information, where the distance information may indicate the distance between the hybrid depth detection device 100 and the one or more target objects 11. For example, the distance information can be obtained from the distance sensor, but the present invention is not limited thereto. In some examples, the information source of the distance information may comprise one or a combination of the distance sensor and a previous depth detection operation (e.g. the hybrid depth detection operation for a previous frame) of the hybrid depth detection device 100.

In Step S11, the hybrid depth detection device 100 can utilize the image processing circuit 130 (e.g. the second partial circuit such as the depth processor 131, or the first partial circuit such as the image processor 132) to determine the distance range (e.g. the selected distance range) according to the distance information (e.g. the distance indicated by the distance information), where the distance range is selected from the multiple predetermined distance ranges regarding the distance. When the distance indicated by the distance information falls within a certain predetermined distance range of the multiple predetermined distance ranges, the image processing circuit 130 (e.g. the second partial circuit such as the depth processor 131) can determine this distance range as the selected distance range. When the distance indicated by the distance information falls within another predetermined distance range of the multiple predetermined distance ranges, the image processing circuit 130 (e.g. the second partial circuit such as the depth processor 131) can determine the other distance range as the selected distance range.

In Step S12, the hybrid depth detection device 100 can utilize the image processing circuit 130 (e.g. the first partial circuit such as the image processor 132) to perform preliminary processing, for generating the ROI information indicating the ROI, where the second partial circuit such as the depth processor 131 can obtain the ROI information indicating the ROI from the first partial circuit such as the image processor 132, and therefore can be notified of the ROI, for performing subsequent processing. For example, during the preliminary processing, the hybrid depth detection device 100 (e.g. the components therein) can perform the following operations:

(1) the image processing circuit 130 (e.g. the first partial circuit such as the image processor 132) can perform projection light-shaping type selection to determine at least one selected projection light-shaping type (e.g. one or more selected projection light-shaping types) corresponding to the selected distance range among multiple predetermined projection light-shaping types (e.g. the projection light-shaping types in various cases, such as the projection light-shaping types as illustrated with Cases (a), (b) and (c) shown in any of FIG. 8 and FIG. 9), where the at least one selected projection light-shaping type can be selected from the multiple predetermined projection light-shaping types; and (2) the adaptive projector 110 can perform projection of the at least one selected projection light-shaping type to perform spatial exposure bracketing, for capturing at least one corresponding image (e.g. one or more corresponding images) with the camera 121, to allow the image processing circuit to perform at least one detection operation (e.g. one or more detection operations) according to the at least one corresponding image to generate at least one detection result (e.g. one or more detection results), for performing subsequent processing of the hybrid depth detection device 100;

but the present invention is not limited thereto.

In Step S13, the hybrid depth detection device 100 can utilize the image processing circuit 130 (e.g. the second partial circuit such as the depth processor 131) to perform the projection type selection to determine the at least one selected projection type corresponding to the distance range (e.g. the selected distance range) among the multiple predetermined projection types (e.g. the first projection type and the second projection type), where the at least one selected projection type is selected from the multiple predetermined projection types.

In Step S13', in response to the at least one selected projection type, the image processing circuit 130 (e.g. the second partial circuit such as the depth processor 131) can trigger execution of one of multiple sub-flows of the working flow. For example, if the at least one selected projection type represents the first projection type regarding the pattern projection for the pattern-detection-type depth detection such as the SL-type depth detection (labeled "SL type" for better comprehension), a first sub-flow comprising Step S14A is executed; otherwise, if the at least one selected projection type represents the second projection type regarding the non-pattern projection for the TOF-type depth detection (labeled "TOF type" for better comprehension), a second sub-flow comprising Step S14B is executed; otherwise, in a situation where the at least one selected projection type comprises both of the first projection type and the second projection type (labeled "Hybrid" for better comprehension), a third sub-flow comprising Steps S15A, S15B and S16 is executed.

In Step S14A, the hybrid depth detection device 100 can utilize the adaptive projector 110 to perform the pattern projection, and more particularly, project the predetermined pattern, to capture at least one corresponding first image such as one or more first images with the camera 121, and utilize the image processing circuit 130 (e.g. the second partial circuit such as the depth processor 131) to perform the first depth detection according to the one or more first images to generate the first depth map, for being outputted as the resultant depth map.

In Step S14B, the hybrid depth detection device 100 can utilize the adaptive projector 110 to perform the non-pattern projection to capture at least one corresponding second image such as one or more second images with the camera 121, and utilizing the image processing circuit 130 (e.g. the second partial circuit such as the depth processor 131) to perform the second depth detection according to the one or more second images to generate the second depth map, for being outputted as the resultant depth map.

In Step S15A, the hybrid depth detection device 100 can utilize the adaptive projector 110 to perform the pattern projection, and more particularly, project the predetermined pattern, to capture at least one corresponding first image such as one or more first images with the camera 121, and utilize the image processing circuit 130 (e.g. the second partial circuit such as the depth processor 131) to perform the first depth detection according to the one or more first images to generate the first depth map.

In Step 515B, the hybrid depth detection device 100 can utilize the adaptive projector 110 to perform the non-pattern projection to capture at least one corresponding second image such as one or more second images with the camera 121, and utilizing the image processing circuit 130 (e.g. the second partial circuit such as the depth processor 131) to perform the second depth detection according to the one or more second images to generate the second depth map.

In Step S16, in a situation where the at least one selected projection type comprises the multiple predetermined projection types such as both of the first projection type and the second projection type, the hybrid depth detection device 100 can utilize the image processing circuit 130 (e.g. the second partial circuit such as the depth processor 131) to perform the depth data combination according to the first depth map and the second depth map to generate the combined depth map (e.g. the weighted depth map) as the resultant depth map.

In Step S17, the hybrid depth detection device 100 (e.g. the image processing circuit 130) can determine whether to stop the working flow. If Yes, the working flow comes to the end; if No, Step S10 is entered.

For example, in response to a start command among the one or more commands, the hybrid depth detection device 100 (e.g. the image processing circuit 130) can start operating according to this working flow, for returning the resultant depth map (e.g. the first depth map of the first sub-flow, the second depth map of the second sub-flow, or the combined depth map of the third sub-flow) to the processing circuit (e.g. the 3D face recognition App, etc. running on the at least one application processor). In Step S17, the hybrid depth detection device 100 (e.g. the image processing circuit 130) can check whether a stop command among the one or more commands is received. When the stop command has been received from the processing circuit, the hybrid depth detection device 100 (e.g. the image processing circuit 130) can determine the checking result of Step S17 to be Yes. When no stop command has been received from the processing circuit, the hybrid depth detection device 100 (e.g. the image processing circuit 130) can determine the checking result of Step S17 to be No. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10. For example, in the third sub-flow comprising Steps S15A, S15B and S16, the order of executing Steps S15A and S15B can be exchanged.

According to some embodiments, the multiple predetermined distance ranges may comprise a first range (e.g. the short-distance range) such as that of the interval [D1, D1.5), a second range (e.g. the medium-distance range) such as that of the interval [D1.5, D2), and a third range (e.g. the long-distance range) such as that of the interval [D2, ∞), where the distance D1.5 may represent an intermediate distance between the distances D1 and D2, such as the intermediate distance ($w_{D1}*D1+w_{D2}*D2$) defined with predetermined weighting values $w_{D1}$ and $w_{D2}$ (e.g. $w_{D1}>0$ and $w_{D2}>0$, and $w_{D1}+w_{D1}=1$), but the present invention is not limited thereto. In addition, when the selected distance range represents the range of the interval [D1, D1.5), the at least one selected projection type may represent the first projection type, to allow the first sub-flow comprising Step S14A to be executed, where the projection field as shown in the upper half of FIG. 3 can be taken as an example of the projection field of the pattern projection; when the selected distance range represents the range of the interval [D1.5, D2), the at least one selected projection type may comprise both of the first projection type and the second projection type, to allow the third sub-flow comprising Steps S15A, S15B and S16 to be executed, where the projection field as shown in the upper half of FIG. 3 can be taken as an example of any (e.g. each) of the respective projection fields of the pattern projection and the non-pattern projection; and when the selected distance range represents the range of the interval [D2, ∞), the at least one selected projection type may represent the second projection type, to allow the second sub-flow comprising Step S14B to be executed, where the projection field as shown in the lower half of FIG. 3 can be taken as an example of the projection field of the non-pattern projection. For brevity, similar descriptions for these embodiments are not repeated in detail here.

According to some embodiments, the multiple predetermined distance ranges may comprise a first range such as that of the interval [D1, D2), and comprise a second range such as that of the interval [D2, ∞), but the present invention is not limited thereto. In addition, when the selected distance range represents the range of the interval [D1, D2), the at least one selected projection type may comprise both of the first projection type and the second projection type, to allow the third sub-flow comprising Steps S15A, S15B and S16 to be executed, where the projection field as shown in the upper half of FIG. 3 can be taken as an example of any (e.g. each) of the respective projection fields of the pattern projection and the non-pattern projection; and when the selected distance range represents the range of the interval [D2, ∞), the at least one selected projection type may represent the second projection type, to allow the second sub-flow comprising Step S14B to be executed, where the projection field as shown in the lower half of FIG. 3 can be taken as an example of the projection field of the non-pattern projection;

wherein the first sub-flow can be omitted. For brevity, similar descriptions for these embodiments are not repeated in detail here.

Figure 11:
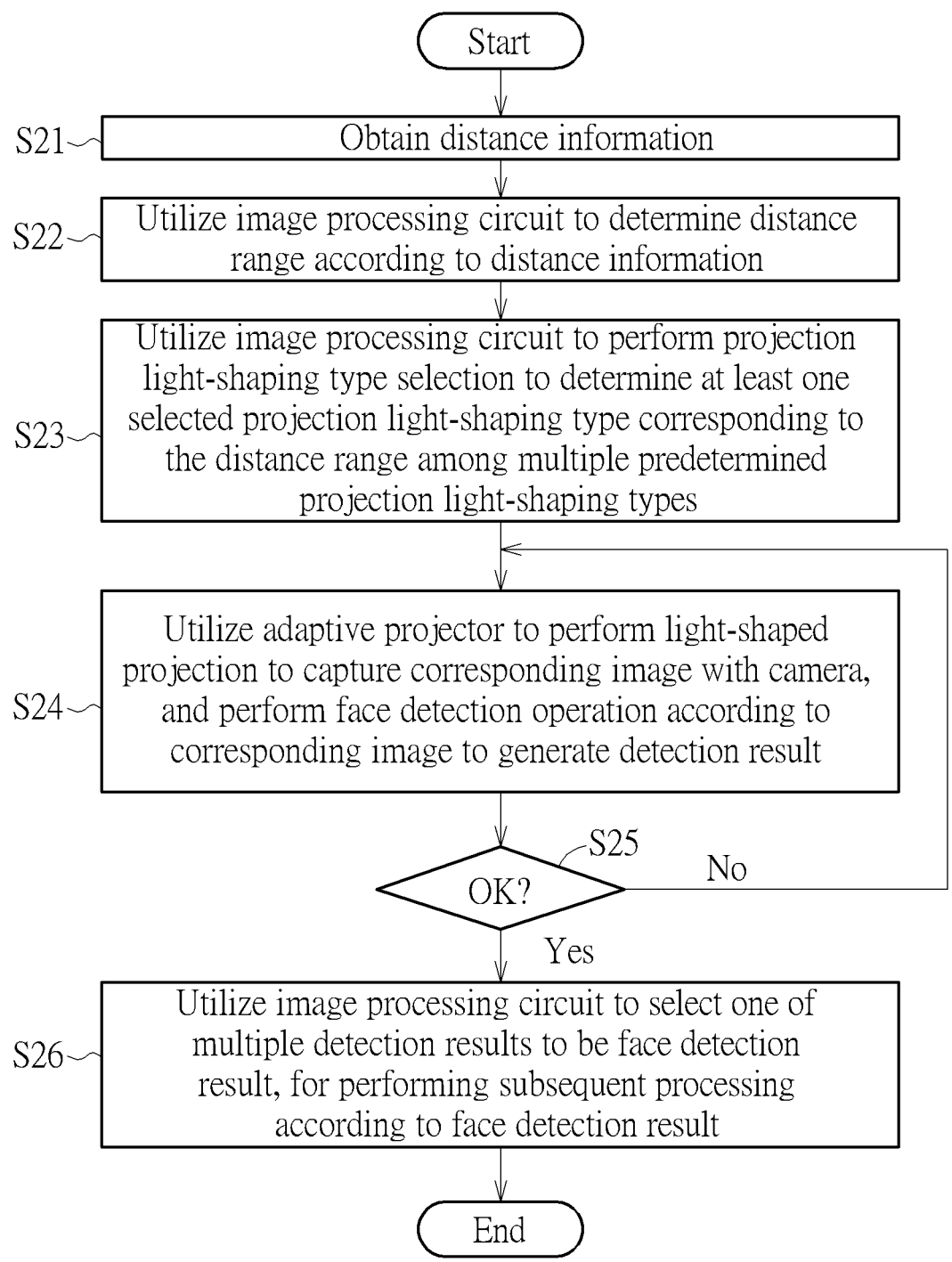
FIG. 11 illustrates a working flow of the method according to another embodiment of the present invention.

FIG. 11 illustrates a working flow of the method according to another embodiment of the present invention.

In Step S21, the image processing circuit 130 (e.g. the second partial circuit such as the depth processor 131, or the first partial circuit such as the image processor 132) can obtain the distance information, where the distance information may indicate the distance between the hybrid depth detection device 100 and the one or more target objects 11, where the operation of Step S21 can be equal to the operation of Step S10, but the present invention is not limited thereto. For example, the distance information can be obtained from the distance sensor. In some examples, the information source of the distance information may comprise one or the combination of the distance sensor and the previous depth detection operation (e.g. the hybrid depth detection operation for the previous frame) of the hybrid depth detection device 100.

In Step S22, the hybrid depth detection device 100 can utilize the image processing circuit 130 (e.g. the second partial circuit such as the depth processor 131, or the first partial circuit such as the image processor 132) to determine the distance range (e.g. the selected distance range) according to the distance information (e.g. the distance indicated by the distance information), where the distance range is selected from the multiple predetermined distance ranges regarding the distance, and the operation of Step S22 can be equal to the operation of Step S11, but the present invention is not limited thereto. When the distance indicated by the distance information falls within a certain predetermined distance range of the multiple predetermined distance ranges, the image processing circuit 130 (e.g. the second partial circuit such as the depth processor 131, or the first partial circuit such as the image processor 132) can determine this distance range as the selected distance range. When the distance indicated by the distance information falls within another predetermined distance range of the multiple predetermined distance ranges, the image processing circuit 130 (e.g. the second partial circuit such as the depth processor 131, or the first partial circuit such as the image processor 132) can determine the other distance range as the selected distance range.

In Step S23, the hybrid depth detection device 100 can utilize the image processing circuit 130 (e.g. the first partial circuit such as the image processor 132) to perform the projection light-shaping type selection to determine the at least one selected projection light-shaping type (e.g. the one or more selected projection light-shaping types) corresponding to the selected distance range (e.g. a long distance range comprising the long distances) among the multiple predetermined projection light-shaping types (e.g. the projection light-shaping types in various cases, such as the projection light-shaping types as illustrated with Cases (a), (b) and (c) shown in any of FIG. 8 and FIG. 9), where the at least one selected projection light-shaping type can be selected from the multiple predetermined projection light-shaping types.

In Step S24, the hybrid depth detection device 100 can utilize the adaptive projector 110 to perform light-shaped projection such as the aforementioned projection of the at least one selected projection light-shaping type to capture the at least one corresponding image (e.g. the one or more corresponding images) with the camera 121, and utilize the image processing circuit 130 (e.g. the first partial circuit such as the image processor 132) to perform the at least one detection operation (e.g. the one or more detection operations) such as at least one face detection operation (e.g. one or more face detection operations) according to the at least one corresponding image to generate the at least one detection result (e.g. the one or more detection results), for performing the subsequent processing of the hybrid depth detection device 100. For better comprehension, assume that the loop index i of the loop comprising Steps S24 and S25 may be a positive integer. In the $i^{th}$ time among at least one time (e.g. one or more times) of executing Step S24 in the loop, the hybrid depth detection device 100 can utilize the adaptive projector 110 to perform the projection of a selected projection light-shaping type of the $i^{th}$ time among the at least one selected projection light-shaping type to capture a corresponding image of the $i^{th}$ time among the at least one corresponding image with the camera 121, and utilize the image processing circuit 130 (e.g. the first partial circuit such as the image processor 132) to perform a face detection operation of the $i^{th}$ time among the at least one face detection operation according to the corresponding image of the $i^{th}$ time to generate a detection result of the $i^{th}$ time among the at least one detection result.

In Step S25, the hybrid depth detection device 100 can utilize the image processing circuit 130 (e.g. the first partial circuit such as the image processor 132) to determine whether the detection result of the $i^{th}$ time is a face detection result (e.g. the detection result indicating that the face of the person in front of the hybrid depth detection device 100 as well as the adaptive projector 110 and the camera 121 thereof in the real space is detected) for determining whether the 2D face detection is successful (labeled "OK" for brevity). If Yes, Step S26 is entered; if No, Step S24 is entered.

In Step S26, the hybrid depth detection device 100 can utilize the image processing circuit 130 (e.g. the first partial circuit such as the image processor 132) to select the best detection result (e.g. the latest detection result) after executing the loop, such as one of multiple detection results (if Step S24 has been executed multiple times in the loop), to be the face detection result, for performing the subsequent processing according to the face detection result.

According to the face detection result, the hybrid depth detection device 100 can utilize the image processing circuit 130 (e.g. the first partial circuit such as the image processor 132) to generate the ROI information indicating the ROI, such as the 2D ROI information indicating the ROI of the 2D image (labeled "2D ROI" in FIG. 1). In addition, the subsequent processing may comprise depth-related detection such as the hybrid depth detection as illustrated with the working flow shown in FIG. 10. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 10. For example, the subsequent processing may comprise at least one portion (e.g. a portion or all) of the working flow shown in FIG. 10. More particularly, the subsequent processing may comprise the partial working flows comprising Steps S13, S13', S14A, S14B, S15A, S15B, S16 and S17, where the determination result "No" of Step S17 may be directed to Step S21 (e.g. if No, Step S21 is entered). For brevity, similar descriptions for these embodiments are not repeated in detail here.

According to some embodiments, the preliminary processing mentioned in Step S12 of the working flow shown in FIG. 10 may comprise a portion of the working flow shown in FIG. 11, such as the partial working flows comprising Steps S23-S26. For example, a procedure running on the image processing circuit 130 may be arranged to control the operations of the hybrid depth detection device 100, where the procedure may comprise the operations of all steps within the working flow shown in FIG. 10, as well as the preliminary processing mentioned in Step S12 thereof (e.g. the partial working flows comprising Steps S23-S26). For brevity, similar descriptions for these embodiments are not repeated in detail here.

According to some embodiments, the multiple predetermined projection light-shaping types may comprise a first projection light-shaping type regarding center-based illumination projection, such as the projection light-shaping type as illustrated with Case (a) shown in any of FIG. 8 and FIG. 9, and comprise a second projection light-shaping type regarding corner-based illumination projection, such as the projection light-shaping type as illustrated with Case (c) shown in any of FIG. 8 and FIG. 9. More particularly, the multiple predetermined projection light-shaping types may further comprise at least one intermediate projection light-shaping type (e.g. one or more intermediate projection light-shaping types) having intermediate projection light-shaping between that of the first projection light-shaping type and the second projection light-shaping type, where the at least one intermediate projection light-shaping type may comprise intermediate projection light-shaping type(s) regarding ring-based illumination projection, such as the projection light-shaping type as illustrated with Case (b) shown in any of FIG. 8 and FIG. 9. For brevity, similar descriptions for these embodiments are not repeated in detail here.

According to some embodiments, the image processing circuit 130 (e.g. the second partial circuit such as the depth processor 131) may be arranged to perform the projection type selection to determine the at least one selected projection type corresponding to the distance range (e.g. the selected distance range) among the multiple predetermined projection types, for performing the subsequent processing, where the at least one selected projection type is selected from the multiple predetermined projection types. In addition, the multiple predetermined projection types may comprise the first projection type regarding the pattern projection of the one or more predetermined patterns, and comprise the second projection type regarding the non-pattern projection of no pattern, where the second projection type may comprise multiple sub-types, and the multiple sub-types of the second projection type may comprise the multiple predetermined projection light-shaping types (e.g. the projection light-shaping types in various cases, such as the projection light-shaping types as illustrated with Cases (a), (b) and (c) shown in any of FIG. 8 and FIG. 9). For brevity, similar descriptions for these embodiments are not repeated in detail here.

Some implementation details regarding Step S24 may be further described as follows. According to some embodiments, the hybrid depth detection device 100 can utilize the adaptive projector 110 to perform the aforementioned projection of the at least one selected projection light-shaping type to perform the spatial exposure bracketing for capturing the at least one corresponding image with the camera 121 to allow the image processing circuit 130 to perform the at least one detection operation according to the at least one corresponding image to generate the at least one detection result, and more particularly, can perform the following operations:

(1) utilizing the adaptive projector 110 to perform the center-based illumination projection, such as the projection of Case (a) shown in any of FIG. 8 and FIG. 9, to capture at least one corresponding first image (e.g. one or more corresponding first images) with the camera 121, and utilizing the image processing circuit 130 to perform a first face detection operation (e.g. the face detection operation of Case (a) shown in FIG. 9) according to the at least one corresponding first image to generate a first detection result, such as the face detection result of Case (a) shown in FIG. 9 (if Case (a) is the current case);

(2) utilizing the adaptive projector 110 to perform the ring-based illumination projection, such as the projection of Case (b) shown in any of FIG. 8 and FIG. 9, to capture at least one corresponding other image (e.g. one or more corresponding other images) with the camera 121, and utilizing the image processing circuit 130 to perform another face detection operation (e.g. the face detection operation of Case (b) shown in FIG. 9) according to the at least one corresponding other image to generate another detection result, such as the face detection result of Case (b) shown in FIG. 9 (if Case (b) is the current case); and (3) utilizing the adaptive projector 110 to perform the corner-based illumination projection, such as the projection of Case (c) shown in any of FIG. 8 and FIG. 9, to capture at least one corresponding second image (e.g. one or more corresponding second images) with the camera 121, and utilizing the image processing circuit 130 to perform a second face detection operation (e.g. the face detection operation of Case (c) shown in FIG. 9) according to the at least one corresponding second image to generate a second detection result, such as the face detection result of Case (c) shown in FIG. 9 (if Case (c) is the current case);

where the at least one detection result may comprise multiple detection results, and the multiple detection results may comprise the first detection result, the other detection result and the second detection result, but the present invention is not limited thereto. For example, in a situation where the at least one selected projection light-shaping type comprises the multiple predetermined projection light-shaping types (e.g. Step S24 may be executed multiple times in the loop shown in FIG. 11), the image processing circuit 130 may be arranged to select one of the multiple detection results to be the face detection result, and perform the subsequent processing according to the face detection result. For brevity, similar descriptions for these embodiments are not repeated in detail here.

According to some embodiments, the image processing circuit 130 (e.g. the first partial circuit such as the image processor 132) may be arranged to switch among at least one portion (e.g. a portion or all) of the multiple predetermined projection light-shaping types (e.g. the projection light-shaping types in various cases, such as the projection light-shaping types as illustrated with Cases (a), (b) and (c) shown in any of FIG. 8 and FIG. 9) to perform the aforementioned projection of the at least one selected projection light-shaping type, select a face detection result (e.g. a certain face detection result among the respective face detection results of Cases (a), (b) and (c) shown in FIG. 9, depending on which case among Cases (a), (b) and (c) is the current case) from the at least one detection result, and perform the subsequent processing according to the face detection result, where the at least one detection result may comprise multiple detection results, but the present invention is not limited thereto. For example, in a situation where the at least one portion of the multiple predetermined projection light-shaping types comprises more than one predetermined projection light-shaping type among the multiple predetermined projection light-shaping types (e.g. Step S24 may be executed multiple times in the loop shown in FIG. 11), the image processing circuit 130 may be arranged to switch among the at least one portion of the multiple predetermined projection light-shaping types to perform the aforementioned projection of the at least one selected projection light-shaping type, select one of the multiple detection results to be the face detection result, and perform the subsequent processing according to the face detection result. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing light shaping with aid of an adaptive projector, the method comprising:
    utilizing an image processing circuit within a hybrid depth detection device to obtain distance information, wherein the distance information indicates a distance between the hybrid depth detection device and one or more target objects;
    utilizing the image processing circuit to determine a distance range according to the distance information, wherein the distance range is selected from multiple predetermined distance ranges regarding the distance;
    utilizing the image processing circuit to perform projection light-shaping type selection to determine at least one selected projection light-shaping type corresponding to the distance range among multiple predetermined projection light-shaping types, wherein the at least one selected projection light-shaping type is selected from the multiple predetermined projection light-shaping types; and
    utilizing the adaptive projector within the hybrid depth detection device to perform projection of the at least one selected projection light-shaping type to perform spatial exposure bracketing, for capturing at least one corresponding image with a camera, to allow the image processing circuit to perform at least one detection operation according to the at least one corresponding image to generate at least one detection result, for performing subsequent processing of the hybrid depth detection device.

2. The method of claim 1, wherein the multiple predetermined projection light-shaping types comprise a first projection light-shaping type regarding center-based illumination projection, and comprise a second projection light-shaping type regarding corner-based illumination projection.

3. The method of claim 2, wherein the multiple predetermined projection light-shaping types further comprise at least one intermediate projection light-shaping type having intermediate projection light-shaping between that of the first projection light-shaping type and the second projection light-shaping type.

4. The method of claim 1, wherein the image processing circuit is arranged to perform projection type selection to determine at least one selected projection type corresponding to the distance range among multiple predetermined projection types, for performing the subsequent processing, wherein the at least one selected projection type is selected from the multiple predetermined projection types; and the multiple predetermined projection types comprise a first projection type regarding pattern projection of one or more predetermined patterns, and comprise a second projection type regarding non-pattern projection of no pattern, wherein the second projection type comprises multiple sub-types, and the multiple sub-types of the second projection type comprise the multiple predetermined projection light-shaping types.

5. The method of claim 1, wherein the multiple predetermined projection light-shaping types comprise a first projection light-shaping type regarding center-based illumination projection, and comprise a second projection light-shaping type regarding corner-based illumination projection; and utilizing the adaptive projector within the hybrid depth detection device to perform the projection of the at least one selected projection light-shaping type to perform the spatial exposure bracketing for capturing the at least one corresponding image with the camera to allow the image processing circuit to perform the at least one detection operation according to the at least one corresponding image to generate the at least one detection result further comprises:
    utilizing the adaptive projector to perform the center-based illumination projection to capture at least one corresponding first image with the camera, and utilizing the image processing circuit to perform a first face detection operation according to the at least one corresponding first image to generate a first detection result; and
    utilizing the adaptive projector to perform the corner-based illumination projection to capture at least one corresponding second image with the camera, and utilizing the image processing circuit to perform a second face detection operation according to the at least one corresponding second image to generate a second detection result;
    wherein the at least one detection result comprises multiple detection results comprising the first detection result and the second detection result, and in a situation where the at least one selected projection light-shaping type comprises the multiple predetermined projection light-shaping types, the image processing circuit is arranged to select one of the multiple detection results to be a face detection result, and perform the subsequent processing according to the face detection result.

6. The method of claim 1, wherein the image processing circuit is arranged to switch among at least one portion of the multiple predetermined projection light-shaping types to perform said projection of the at least one selected projection light-shaping type, select a face detection result from the at least one detection result, and perform the subsequent processing according to the face detection result.

7. The method of claim 6, wherein the at least one detection result comprises multiple detection results; and in a situation where the at least one portion of the multiple predetermined projection light-shaping types comprises more than one predetermined projection light-shaping type among the multiple predetermined projection light-shaping types, the image processing circuit is arranged to switch among the at least one portion of the multiple predetermined projection light-shaping types to perform said projection of the at least one selected projection light-shaping type, select one of the multiple detection results to be the face detection result, and perform the subsequent processing according to the face detection result.

8. The method of claim 1, wherein an information source of the distance information comprises one or a combination of a distance sensor within the hybrid depth detection device and a previous depth detection operation of the hybrid depth detection device.

9. The adaptive projector that operates according to the method of claim 1.

10. The image processing circuit that operates according to the method of claim 1.

11. A hybrid depth detection device, comprising:

an image processing circuit, arranged to obtain distance information, determines a distance range according to the distance information, and perform projection light-shaping type selection to determine at least one selected projection light-shaping type corresponding to the distance range among multiple predetermined projection light-shaping types, wherein the distance information indicates a distance between the hybrid depth detection device and one or more target objects, the distance range is selected from multiple predetermined distance ranges regarding the distance, and the at least one selected projection light-shaping type is selected from the multiple predetermined projection light-shaping types;

an adaptive projector, coupled to the image processing circuit, arranged to perform projection of the at least one selected projection light-shaping type to perform spatial exposure bracketing, to allow the hybrid depth detection device to capture at least one corresponding image with a camera; and the camera, coupled to the image processing circuit, arranged to capture the at least one corresponding image;

wherein:

the image processing circuit performs at least one detection operation according to the at least one corresponding image to generate at least one detection result, for performing subsequent processing of the hybrid depth detection device, wherein the subsequent processing comprises depth-related detection.

\* \* \* \* \*